United States Patent [19]

Green et al.

[11] 3,818,140

[45] June 18, 1974

[54] TELEPHONE LINE RECEIVER AND TRANSMITTER

[75] Inventors: Norman Green; William C. Vergara, both of Baltimore, Md.

[73] Assignee: The Bendix Corporation, Southfield, Mich.

[22] Filed: Nov. 17, 1972

[21] Appl. No.: 307,741

[52] U.S. Cl. .................................. 179/2 C, 330/26

[51] Int. Cl. .......................................... H04m 11/06

[58] Field of Search.... 179/1 C, 2 C, 18 FA, 170 T; 330/12, 26, 27, 28, 97, 112, 165, 192, 195, 197

[56] References Cited

OTHER PUBLICATIONS

Philbrick/Nexus Research (A Teledyne Co.) 1968, Dedham, Mass 02026 Title – Applications Manual for Operational Amplifiers, page 65, circuit III. 3.

*Primary Examiner*—Kathleen H. Claffy
*Assistant Examiner*—L. T. Bartz
*Attorney, Agent, or Firm*—W. G. Christoforo; Bruce L. Lamb

[57] ABSTRACT

A telephone line receiver transmitter designed to an interface with a 600 ohm telephone line through a standard telephone system data coupler uses a single operational amplifier and operates without switching. The operational amplifier includes a 600 ohm feedback resistor with the telephone system data coupler being connected across the resistor.

3 Claims, 2 Drawing Figures

TELEPHONE LINE RECEIVER AND TRANSMITTER

BACKGROUND OF THE INVENTION

This invention relates to a combination telephone line receiver and transmitter which couples to a standard commercial telephone system and is adapted for use with either voice or data communications.

Information is coupled into the telephone system line for transmission therethrough through a standard telephone system data coupler which includes a transformer. Commercial telephone lines are normally 600 ohm, hence, it is desirable that data be driven into the telephone lines from a 600 ohm source and that data received from the telephone line be delivered into a 600 ohm load. One means of transmitting data into the telephone lines and receiving data therefrom has been through the use of a 600 ohm amplifier connected to drive one winding of the telephone system data coupler and providing a second amplifier having a high input impedance connected across the same transformer winding.

The present invention makes use of a single amplifier having an extremely high gain, commonly known as an operational amplifier. The information to be transmitted over the telephone lines, which is audio frequency and may be either voice, data or the like, is applied to the non-inverting input terminal of the operational amplifier. A 600 ohm feedback resistor is connected between the output terminal of the operational amplifier and its inverting input terminal and a further resistor is connected between the inverting terminal and ground. The primary winding of the telephone system data coupler is connected across the 600 ohm feedback resistor with information being received from the telephone lines between the output terminal of the operational amplifier and ground.

It is thus an object of this invention to provide a receiver/transmitter for use with a telephone line which operates without switching and uses a single operational amplifier.

DESCRIPTION OF THE PREFERRED EMBODIMENT

Figure 1:
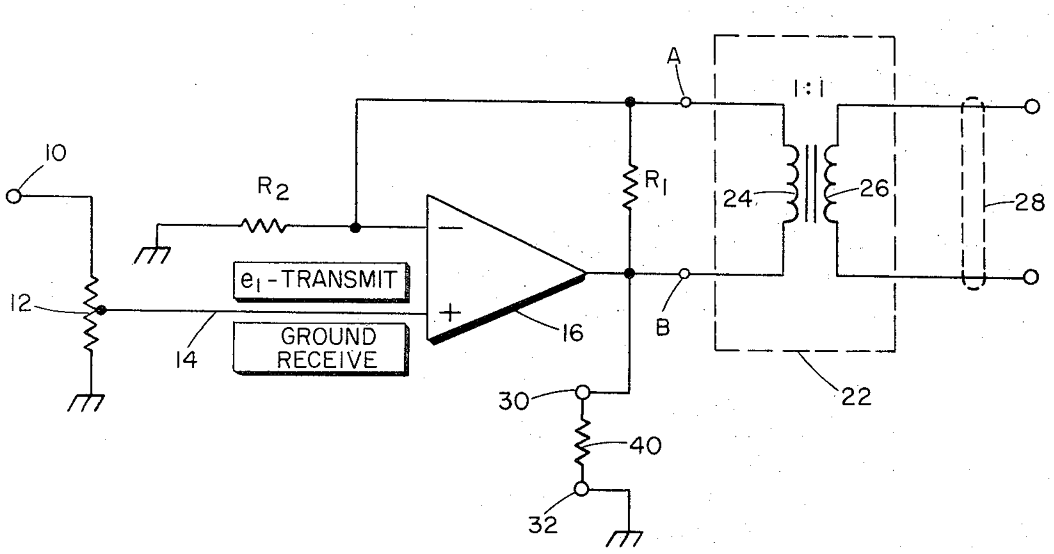
FIG. 1 is a modified schematic of the invention.

Referring to FIG. 1, information to be transmitted in the audio frequency band is applied via input terminal 10 across resistor 12. A point on resistor 12 is coupled through line 14 to the non-inverting input terminal of an operational amplifier 16. The inverting input terminal of operational amplifier 16 is connected through a resistor $R_2$ to ground. A feedback resistor $R_1$ having a desired resistance, which in this case is 600 ohms, is connected between the operational amplifier output terminal and the operational amplifier inverting input terminal. A standard telephone system data coupler 22 has access terminals A and B connected across resistor $R_1$. The telephone system data coupler consists of a simple 1:1 transformer having a first winding 24 and a second winding 26 having terminals contained in and represented by cable 28 which are connected in the manner known to those skilled in the art to input terminals of a telephone line. Winding 24 characteristically presents a high impedance to the frequencies normally transmitted through the telephone lines, this impedance being much larger than the impedance of resistor $R_1$.

When the device of FIG. 1 is used to transmit information into the telephone lines that information is impressed at terminal 10 and appears at line 14, that is, the non-inverting input terminal of operational amplifier 16, as voltage $e_1$. Assuming a theoretically perfect amplifier, the voltage at point B will adjust itself to produce the input voltage $e_1$ across resistor $R_2$. Since winding 24 presents an impedance much higher than resistor $R_1$ at these frequencies, resistor $R_1$ will be driven by a current source $i = (e_1/R_2)$. The load impedance connected across terminals A and B sees a generator of impedance $R_1$ with a source voltage of $iR_1 = e_1 \times (R_1/R_2)$.

Figure 2:
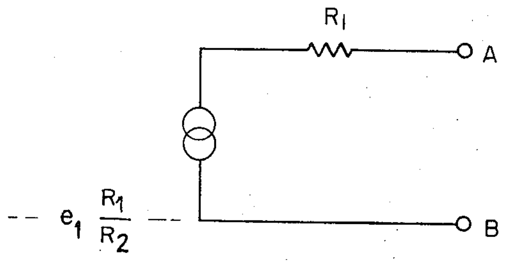
FIG. 2 illustrates the equivalent circuit of the invention when operating as a transmitter.

The equivalent circuit of the device when operating as a transmitter is shown in FIG. 2, reference to which figure should now be made. This figure shows the equivalent voltage source connected in series with resistor $R_1$ across terminals A and B thus satisfying the requirement that the telephone system data coupler be driven by a 600 ohm source since $R_1$ has been made equal to 600 ohms in this particular embodiment.

Returning now to FIG. 1, it can be seen that terminal B, that is the output terminal of operational amplifier 16, is connected to a terminal 30 and a terminal 32 is connected to ground. When the device of FIG. 1 is used as a line receiver information from the telephone line is received at terminals A and B and is available at output terminals 30 and 32. The utilization means which responds to information received from the telephone line is represented by an impedance 40. When the device is used as a receiver no signal is impressed at terminal 10, hence the voltage on line 14, that is at the non-inverting input terminal of operational amplifier 16, goes to ground. The voltage at the inverting input terminal of operational amplifier 16 also goes to ground so that no current flows in resistor $R_2$. Since the voltage across resistor $R_2$ is zero volts, the input impedance across terminals A and B is exactly equal to the impedance of resistor $R_1$, which in this case is 600 ohms. In other words, the voltage generated by operational amplifier 16 produces an output at terminal 30 equal to the voltage received from the telephone lines and this voltage will be just sufficient to maintain the voltage at the inverting input terminal of operational amplifier 16 at ground potential. Thus, the voltage across terminals 30 and 32 will exactly reproduce the signal received from the telephone lines. It is now only necessary that operational amplifier 16 be able to provide sufficient current to drive utilization means 40.

The invention claimed is:

1. A line transmitter and receiver for communicating information with a telephone line through a telephone system data coupler which includes a transformer having a first winding which is connected to the line transmitter and receiver and a second winding which is connected to the telephone line comprising:
   - an operational amplifier having a non-inverting input terminal, an inverting input terminal, and an output terminal;
   - a common terminal;
   - another terminal upon which information to be transmitted is impressed;
   - resistance means for connecting said another terminal to said common terminal;

means for connecting a point interior of said resistance means to said non-inverting input terminal;

a first resistor connected between said inverting input terminal and said common terminal;

a feedback resistor connected between said operational amplifier output terminal and said inverting input terminal, said first winding being connected across said feedback resistor, and;

means for effectively connecting said operational amplifier output terminal to said common terminal, information received from said telephone lines thereby appearing thereacross.

2. A line transmitter and receiver as recited in claim 1 wherein said information to be communicated occurs within an audio frequency range and wherein said first winding is a much higher impedance than the impedance of said feedback resistor at said audio frequency range.

3. A line transmitter and receiver as recited in claim 2 wherein said feedback resistor is approximately 600 ohms.

* * * * *